US009704381B2

(12) United States Patent
Mello

(10) Patent No.: US 9,704,381 B2
(45) Date of Patent: *Jul. 11, 2017

(54) METHOD FOR IMPLEMENTING QUALITY ALARMS IN AN ENERGY MANAGEMENT SYSTEM REMOTE TERMINAL

(71) Applicant: GridPoint, Inc., Arlington, VA (US)

(72) Inventor: Erin Mello, Arlington, VA (US)

(73) Assignee: GridPoint, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/835,084

(22) Filed: Aug. 25, 2015

(65) Prior Publication Data
US 2015/0364032 A1    Dec. 17, 2015

Related U.S. Application Data

(63) Continuation of application No. 13/842,901, filed on Mar. 15, 2013, now Pat. No. 9,116,519.

(51) Int. Cl.
G08B 29/00    (2006.01)
G08B 29/18    (2006.01)
G05B 23/02    (2006.01)

(52) U.S. Cl.
CPC ....... *G08B 29/185* (2013.01); *G05B 23/0272* (2013.01)

(58) Field of Classification Search
None
See application file for complete search history.

(56) References Cited

U.S. PATENT DOCUMENTS

| | | | | |
|---|---|---|---|---|
| 5,398,277 A * | 3/1995 | Martin, Jr. | ........... | G08B 25/001 379/309 |
| 6,697,970 B1 * | 2/2004 | Chisholm | ........... | H04L 41/0213 714/48 |
| 2006/0168013 A1 * | 7/2006 | Wilson | ............... | G05B 19/4184 709/206 |
| 2006/0208872 A1 * | 9/2006 | Yu | .......................... | G08B 25/08 340/517 |
| 2010/0004759 A1 * | 1/2010 | Scott | ................. | G05B 23/0216 700/12 |

(Continued)

*Primary Examiner* — Julie Lieu
(74) *Attorney, Agent, or Firm* — Bookoff McAndrews, PLLC

(57) ABSTRACT

Methods for creating high quality alarms raise EMS operator awareness to abnormal conditions in monitored assets across multiple sites in a single EMS software platform. An embodiment includes steps for accessing an alarm designer software tool that contains a library of alarm definitions and the ability to create new alarm definitions, clone and edit existing alarm definitions, lock alarm definitions and delete alarm definitions. Applicable data is defined using channel attributes identifying which channel or channels associated with the multiple monitored sites are to be evaluated for alarming conditions. The alarm frequency, trigger conditions, pending open duration, close conditions, and pending close duration are also defined. Alarms can trigger upon one or more channels' behavior over periods of time and conditional relationships between multiple channels. Close conditions for an alarm can be, but are not required to be, the resolution of the trigger conditions.

20 Claims, 18 Drawing Sheets

(56) References Cited

U.S. PATENT DOCUMENTS

| | | | | |
|---|---|---|---|---|
| 2012/0117109 A1* | 5/2012 | Bauernfeind | ......... | H04L 41/022 707/769 |
| 2013/0176858 A1* | 7/2013 | Zee | ........................ | H04L 43/08 370/241 |
| 2013/0297748 A1* | 11/2013 | Wilson | ............... | G05B 19/4184 709/219 |

* cited by examiner

FIG. 6

Alarm Configuration Entry Screen

```
                                                                  Log Out

Alarm Definitions                                       [⊕ Clone] [⊖ Close]

Name
  [HVAC Calling for Cool, No Load                                        ]

Frequency
  [Every 15 minutes           ▼]

Applicable Data
  [{category='HVAC',unit='KILOWATT'} as HVACload
   and{measure_type='RUN_TIME_COOL1',category='HVAC',unit='MINUTE'} as cool1RT]

Trigger Condition
  [cool1RT==15 && HVACload==0                                            ]

Pending Open Duration
  [60          ] [Min / Mins    ▼]

Close Condition
  [cool1RT==15 && HVACload > 0                                           ]

Pending Close Duration
  [30          ] [Min / Mins    ▼]

[Save & Validate]
```

Report Parameters

| | |
|---|---|
| Alarm Name | Voltage Phase Drop (updated for all customers) |
| # Sites | *x* |
| Applicable Data | [channel_name="V1N" or "Phase A", category=MAIN] as V1N and [channel_name="V2N" or "Phase B", category=MAIN] as V2N and [channel_name="V3N" or "Phase C", category=MAIN] as V3N |
| # Potential Alarm Instances | 3x |
| Frequency | every 15 minutes |
| Trigger Condition | V1N < 100 or V2N < 100 or V3N < 100 |
| Pending Open Period | 45 min |
| Close Condition | V1N > 100 or V2N > 100 or V3N > 100 |
| Pending Closed Period | 30 min |
| Test Data Start Time | 2/1/2013 0:00 |
| Test Data End Time | 2/15/2013 0:00 |
| Definition | alarm every 15 minutes on [channel_name="V1N" or "Phase A", category=MAIN] as V1N and [channel_name="V2N" or "Phase B", category=MAIN] as V2N and [channel_name="V3N" or "Phase C", category=MAIN] as V3N when V1N < 100 or V2N < 100 or V3N < 100 for 45 minutes; clear when V1N > 100 or V2N > 100 or V3N > 100 after 15 minutes |

Triggered Alarm Instances

| Site ID | Site Name | Potential Alarm Instance ID | Applicable Channels | Start Time | Close Time | Duration | Alarm State |
|---|---|---|---|---|---|---|---|
| SITE12 | Casual Dining Restaurant 12 | 129 | V1N, V2N, V3N | 2/3/2013 18:00 | 2/3/2013 19:30 | 1:30 | Closed |

FIG. 11

Pending Open Alarms

| Site ID | Site Name | Potential Alarm Instance ID | Applicable Channels | Start Time | Close Time | Duration | Alarm State |
|---|---|---|---|---|---|---|---|
| SITE11 | Family Rec Center 11 | 128 | V1N, V2N, V3N | 2/3/2013 21:45 | 2/3/2013 22:00 | 0:15 | Pending Open |
| SITE135 | Retail Service Center 135 | 135 | Phase A, Phase B, Phase C | 2/4/2013 9:30 | 2/4/2013 9:45 | 0:15 | Pending Open |
| SITE137 | Quick Serve Restaurant 137 | 137 | V1N, V2N, V3N | 2/4/2013 10:00 | 2/4/2013 10:30 | 0:30 | Pending Open |
| SITE122 | Power Quality 122 | 134 | V1N, V2N, V3N | 2/4/2013 10:45 | 2/4/2013 11:00 | 0:15 | Pending Open |
| SITE102 | Grocery 102 | 136 | V1N, V2N, V3N | 2/4/2013 13:15 | 2/4/2013 13:30 | 0:15 | Pending Open |
| SITE101 | Grocery 101 | 137 | V1N, V2N, V3N | 2/4/2013 13:45 | 2/4/2013 14:00 | 0:15 | Pending Open |
| SITE105 | Grocery 105 | 138 | V1N, V2N, V3N | 2/4/2013 14:15 | 2/4/2013 14:30 | 0:15 | Pending Open |
| SITE124 | Demand Peaks 124 | 139 | V1N, V2N, V3N | 2/4/2013 15:00 | 2/4/2013 15:15 | 0:15 | Pending Open |
| SITE100 | Grocery 100 | 140 | V1N, V2N, V3N | 2/4/2013 15:30 | 2/4/2013 15:45 | 0:15 | Pending Open |
| SITE123 | Power Failure 123 | 141 | V1N, V2N, V3N | 2/4/2013 16:00 | 2/4/2013 16:15 | 0:15 | Pending Open |

FIG. 12

Pending Close Alarms

| Site ID | Site Name | Potential Applicable Channels | Start Time | Close Time | Duration | Alarm State |
|---|---|---|---|---|---|---|
| SITE12 | Casual Dining Restaurant 1 | 129 V1N, V2N, V3N | 2/3/2013 18:15 | 2/3/2013 18:30 | 0:15 | Pending Close |

FIG. 13

METHOD FOR IMPLEMENTING QUALITY ALARMS IN AN ENERGY MANAGEMENT SYSTEM REMOTE TERMINAL

This application is a continuation of U.S. patent application Ser. No. 13/842,901 filed Mar. 15, 2013 entitled "Method for Implementing Quality Alarms in an Energy Management System Remote Terminal," now U.S. Pat. No. 9,116,519, issued Aug. 25, 2015, the entire disclosure of which is incorporated herein by reference.

BACKGROUND OF THE INVENTION

1. Field of the Invention

The invention relates generally to systems and methods for creating and implementing alarms in an energy management system. More specifically, the invention relates to how alarms are defined (their lifecycle and parameters), to a method for evaluating the efficacy of alarm definitions before implementation, and to enabling and managing alarms at scale for multi-site operators.

2. Description of the Related Art

An energy management system (EMS) typically monitors and, in some cases, controls multiple endpoints such as HVAC units, lighting panels, natural gas consumption, refrigeration, temperature monitors, and other power consuming or monitoring devices located throughout one or more zones of a building or buildings. The monitored data is transmitted to a central control and monitoring system that can be local to the building or buildings being monitored or can be remote to the building or buildings being monitored. The data is typically presented to a user overseeing the operation of one or more of the buildings via a computer monitor coupled to a data storage area, either locally or at a remote location via a server controlled by a third party provider. The operator can identify certain alarm conditions, such as an abnormally high temperature in a refrigeration system, a door left open, lights left on when the building is unoccupied, or an unusually high HVAC system cycle time. An operator can then take immediate actions to mitigate problems associated with such alarm conditions.

As can be appreciated, a large amount and wide variety of data can be generated by the various monitoring systems, especially when monitoring a large number of facilities. To alleviate the information burden on the operator, and to make the data more actionable, intelligent alarm conditions (e.g. more sophisticated that static threshold) should be created, which when met, automatically raise an alarm and send an alert or notification to the operator so the operator can take appropriate and timely action. In addition, if possible, alarms should be defined using common attributes for monitoring points and enabled at the company level so they are inherited by future sites that are commissioned in the EMS, eliminating the administrative burden of configuring alarms at each site for multi-site operations.

However, even inherited alarms with intelligent trigger conditions, when enabled for even a small number of sites can create an overwhelming number of operator notifications in a system that monitors multiple buildings, especially if the alarms do not have the proper lifecycle. Alarms that do not have pending (or buffer) periods, or that have close conditions that are simply a reverse of trigger conditions can result in noisy repeat alarms or alarms that do not reset appropriately (stuck alarms). Moreover, when initially creating a new alarm, it is difficult to predict ahead of time exactly how the alarm will behave. Care must be taken to avoid too many false or repeat alarms when releasing a new alarm into an EMS.

To prevent overly noisy alarms while preserving alarm sensitivity, intelligent alarm definition parameters and a multi-stage alarm lifecycle is needed. What is further needed is an alarm creation tool that allows a user or operator to test new alarms thoroughly and robustly before releasing them into a live EMS. Also needed are tools to effectively enable and manage alarm troubleshooting across multiple sites with the ability to easily drill into each alarm instance for a particular operation or piece of equipment.

BRIEF SUMMARY OF THE INVENTION

Various embodiments of the invention solve the above-mentioned problems by providing an energy management system with alarms that have trigger conditions (not simply thresholds) and close conditions (not necessarily a simple reverse of trigger condition), and a lifecycle based on defined parameters for pending open and close durations that ensure alarm conditions persist for specified lengths of time before raising or closing an alarm.

To ensure that the alarm will work before it goes live, the operator can run any alarm definition against legacy monitoring data to observe how it reacts, and use the results from this test to adjust alarm parameters accordingly. Once alarm definitions are fine-tuned, the definitions are locked and can serve as templates or a menu of alarm constructs. Template alarm definitions can be cloned and variations of the same alarm construct can be created so the appropriate alarm is created for each group of like buildings or equipment for a specific EMS operator. When alarms are enabled across a group of sites, they can be enabled at the company level (or sub-company level—e.g. region, state, utility, or other defined grouping). This prevents the need to configure an alarm every time new sites are added to the company (these sites can automatically inherit the alarm) and eases the burden on EMS operators who manage multiple alarms across hundreds or thousands of sites.

Once enabled, triggered alarms can prompt email notifications or be viewed in a consolidated dashboard view that highlights alarms, by type, for selected sites and time ranges. The ability to drill into individual triggered alarm instances and see the applicable data (may be many monitoring points) related to an alarm helps the operator effectively manage and troubleshoot alarm conditions.

BRIEF DESCRIPTION OF THE DRAWINGS

These and other features, aspects, and advantages of the present invention will become better understood with reference to the following description and appended claims, and accompanying drawings where:

FIG. 6 is a screen shot illustrating an alarm designer tool library of alarm definitions that may be selected for editing or testing, cloned, locked, or deleted.

FIG. 7 is a screen shot illustrating an alarm definition screen for the creation or editing of an alarm definition.

FIG. 8 is a screen shot illustrating an alarm site tree and test date selection for the creation of an alarm test results file.

FIG. 9 is a table illustrating an alarm test results Parameters Report.

FIG. 10 is a table illustrating an alarm test results Potential Alarm Instances Report.

FIG. 11 is a table illustrating an alarm test results Triggered Alarms Report.

FIG. 12 is a table illustrating an alarm test results Pending Open Alarms Report.

FIG. 13 is a table illustrating an alarm test results Pending Close Alarms Report.

Figure 1:
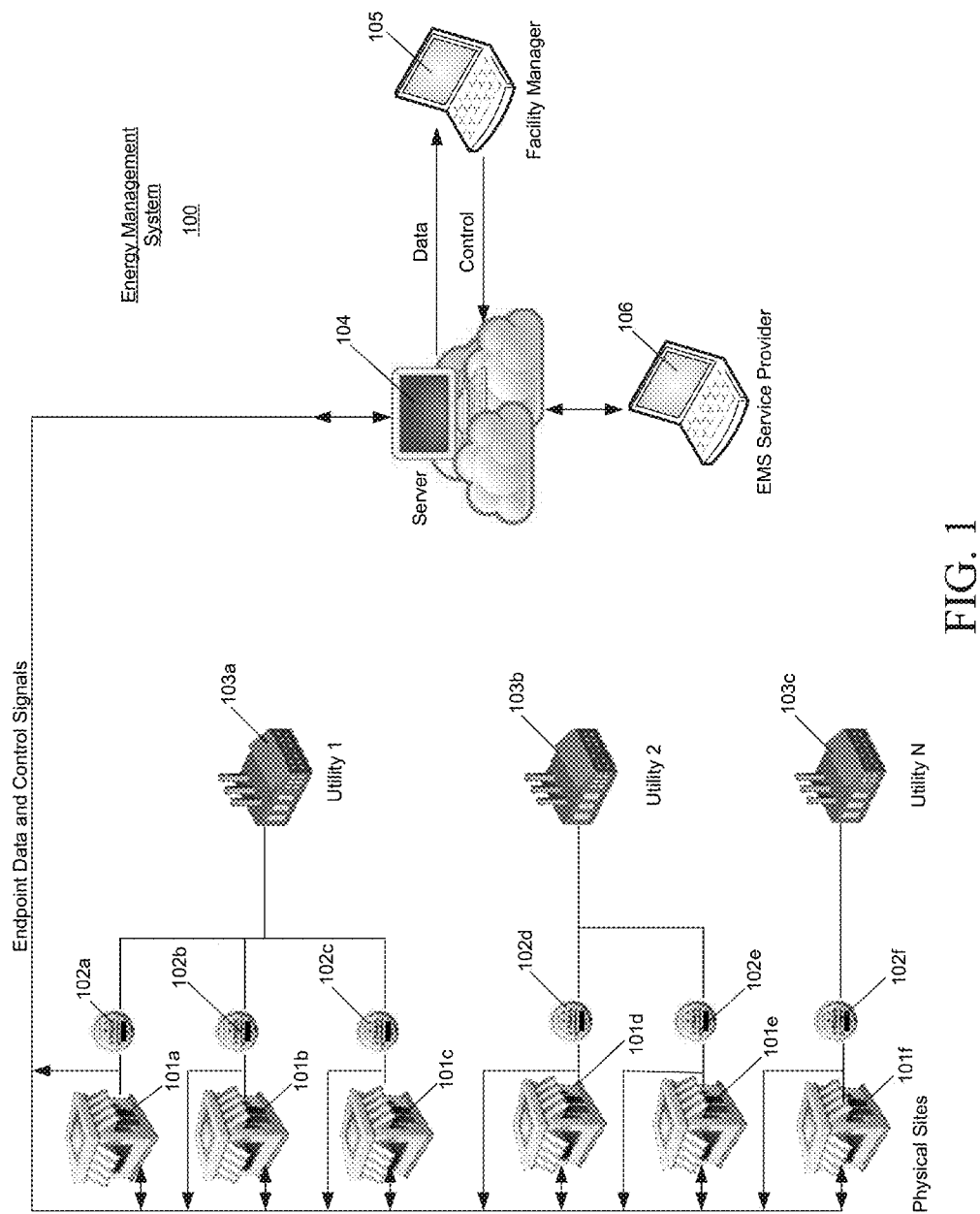
FIG. 1 is a block diagram illustrating an energy management system controlling and monitoring multiple building sites.

Some figures illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk or the like). Similarly, the programs may be standalone programs, may be incorporated as subroutines in an operating system, may be functions in an installed software package, and may reside in collocated or remotely located servers. It should be understood that the various embodiments are not limited to the arrangements and instrumentalities shown in the drawings.

DETAILED DESCRIPTION OF THE INVENTION

The present invention may be understood more readily by reference to the following detailed description of preferred embodiments of the invention as well as to the examples included therein. Embodiments of the invention provide systems and methods for the creation, editing, testing, and activation of alarms in an EMS.

Each physical site has installed in it monitoring and control hardware that is part of the energy management system and separate from the utility-installed electric meter. The monitoring equipment measures near real-time (for example, every 1 or 15 min) main load power demand and voltage, and also monitors data from other devices that measure temperature, humidity, CO2, and other metrics. Data originating from a device is considered a data "channel." Further, channels may be logically grouped into other channels, for example, all HVAC units at a building site or all temperature settings of a group of buildings within a region. Preferably, the monitoring equipment sends the channel data to the energy management system software to be stored and processed. Preferably, this incoming data should include, or have associated with it, commonly defined channel attributes, also sometimes referred to as "metadata", such as data type, measurement type, unit of measure, and the like, so that each time-series data "channel" can be leveraged in alarm definitions. Using the attributes, alarms can be set up to trigger when the specific data channels match defined trigger conditions, and close when defined close conditions are met. In an embodiment, the operator is notified of such events, typically through either the EMS or via other notification mechanisms.

The operator can access the energy management system software remotely using a third party provider, or do so directly in cases where the software is installed at the user-operated control center. The operator can respond to alarms by causing control signals to be sent to the energy management system to affect energy usage at one or more of its sites and can receive monitoring data describing usage at one or more of its sites. The control equipment responds to commands from the energy management system software to regulate selected sub-loads as needed. Using the energy management software, the user can also control sub-loads according to specific schedules at each site to optimize energy usage and minimize energy costs by enabling, either directly by an operator, indirectly by a third-party energy management provider, or automatically by any number of load control algorithms reacting to energy event alerts raised by the energy management system.

FIG. 1 is an illustration of an energy management system 100 for controlling and monitoring multiple building sites 101a-101f. In a typical system, multiple building sites 102a-102f are spread across different geographic areas, and sometimes receive electric power from an electric utility within each geographic area. For purposes of illustration, electric utilities 103a-103c are shown, but other types of utilities, such as a natural gas utility, could also be included. Utilities 103a-103c typically monitor energy consumption and demand using meters 102a-102f located at the utility side of the interconnection point of building sites 101a-101f, while the EMS typically monitors main line power usage at the facility side of the interconnection points as well as sub-metering of multiple end points within the facility itself. Other data is also measured by the EMS at each building site and sent back to a central server 104 via network hosted by a third party EMS provider. A system operator, such as a facility manager, has remote access to the EMS servers via wired or wireless connection using a computer terminal 105. The facility manager can receive endpoint data from one or more of her facilities 101a-101f, view alarms in the EMS portal and receive actionable alarm notifications. The facility manager can take responsive or corrective action based on the alarms remotely via the remote server 104. The third-party EMS provider also has access to the EMS, using a terminal 106, for the purpose of providing support, maintenance, and additional services.

Figure 2:
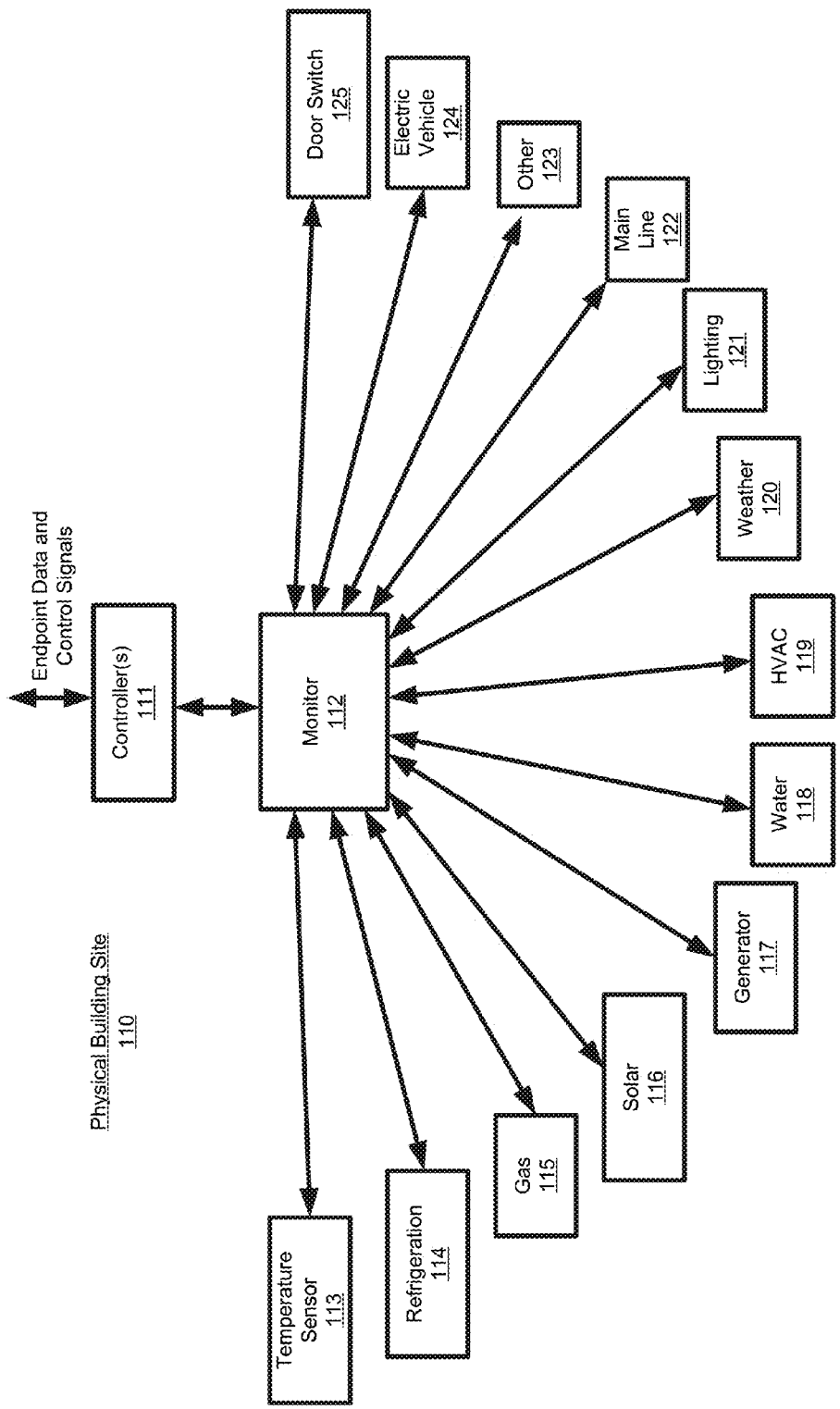
FIG. 2 is a block diagram illustrating EMS site hardware monitoring various endpoints at a physical site with specific detail of HVAC and lighting control.

FIG. 2 is an illustration of site hardware monitoring various endpoints, sensors, or data sources 113-125, at a physical building site 110. In particular, each facility is equipped with one or more site controllers 111 communicatively coupled to one or more monitoring devices 112. Any number of parameters can be monitored, including but not limited to main line voltage and current 122, lighting 121, HVAC 119, generators 117, gas flow 115, refrigeration units 114, solar arrays 116, water consumption 118, weather data 120, door switches 125, electric vehicles and electric vehicle charging stations 124, thermostats 113 or other sensing device or data source 123. Monitored data flows from the monitoring devices 112 through the controllers 111 and on to the remote server 104 via a wired or wireless network.

Figure 3:
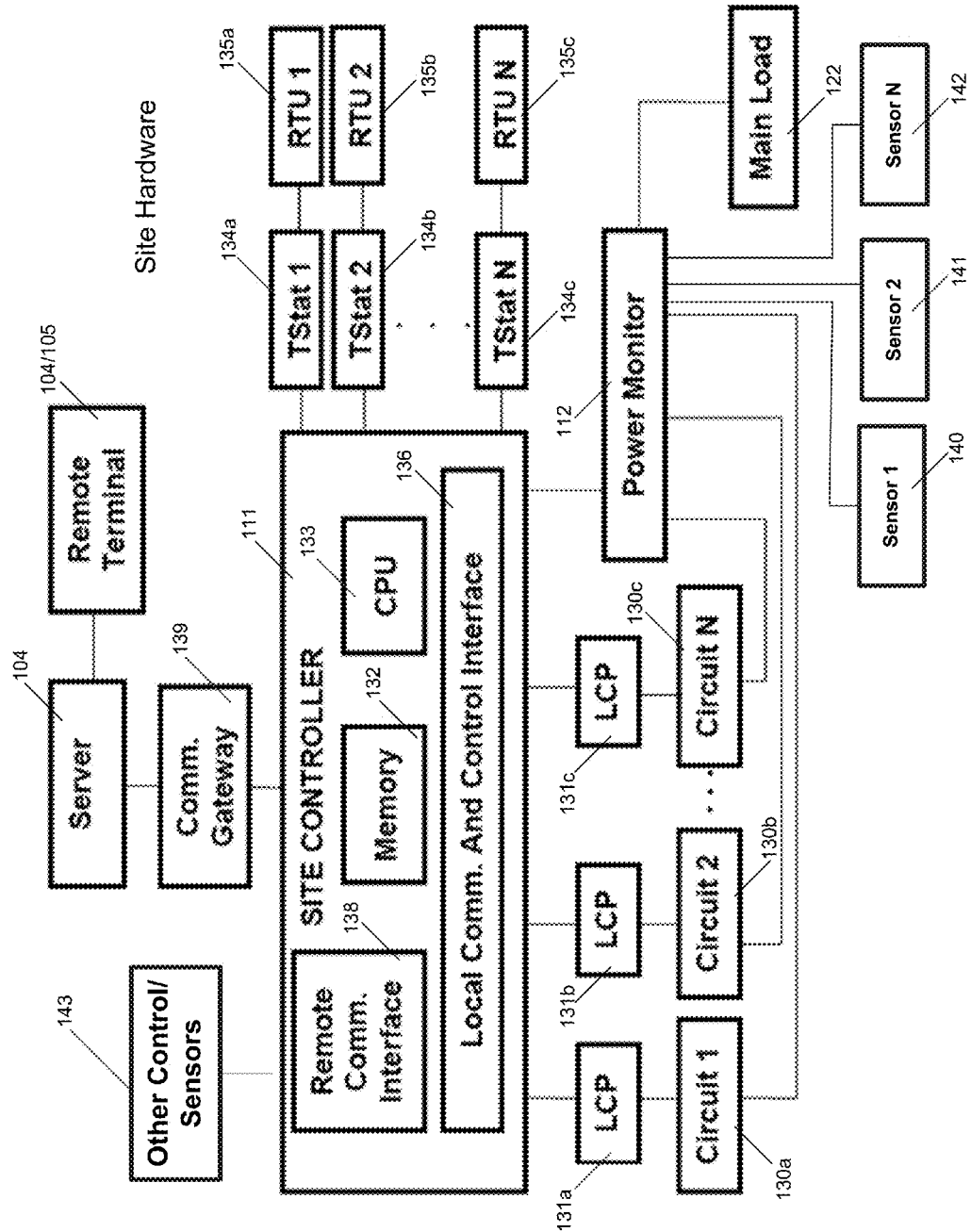
FIG. 3 is a block diagram illustrating simplified configuration of a site controller and monitor at physical site.

FIG. 3 is detailed schematic block diagram illustrating typical energy management system hardware installed at a physical building site. A site controller 111 with embedded control algorithms controls multiple electrical loads on circuits 1 through N (130a-130c) via light control panels (LCPs) (131a-131c). The site controller 111 is typically wired to common voltages at an electrical distribution panel (not shown) of a building facility via a main line meter (power monitor) 112. The site controller 111 includes memory 132 and a CPU 133 for respectively storing and implementing energy management algorithms. The algorithms accept real-time power and environmental variable measurements (including readings from thermostats TStat 1 through TStat N (134a-134c)) as inputs and determine how to control the power delivered on the circuits 1 through N (130a-130c) and to control set points and other configurable settings such as enabling/disabling compressor stages on TStat 1 through TStat N (135a-135c). The site controller 111 may include a power supply (not shown) and one or more wired or wireless local communication and control interfaces (136) for controlling circuits 1 through N (130a-130c) and TStat 1 through TStat N (134a-134c). Thermostats TStat 1 through TStat N (134a-134c) provide temperature and humidity inputs to the site controller 111, and output control signals to roof-top units RTU 1 through RTU N (137a-137c). A communication interface 138 provides bi-directional communication with a communication gateway 139, which in turn manages wired or wireless communications with a server 104 or remote terminal 105.

One or more power monitors 112 are coupled to the site controller either via wired or wireless connection. The power monitor 112 includes hardware and firmware to provide sampling functionality, including multiple analog-to-digital converters for multi-channel fast waveform sampling of inputs such as current and voltage. The power monitor includes wired or wireless communication interfaces, current and voltage monitoring interfaces, memory, CPU, and may also include a power supply. The current and voltage monitoring interfaces connect between the power circuits being monitored and the A/D converter. Each channel may be connected to a separate power circuit to monitor the flow of current through the circuit. The connection is typically made with a current transformer at both a supply (i.e., hot) line and a return (i.e., neutral) line of the power circuit, which provides a waveform signal that is representative of the current flow at the connection point. The power monitor can receive power voltage and current measurements from the main line 122 as well as measurements from any of a number of devices 140-142 or groups of devices, as illustrated in FIG. 2 and described herein. Controller 111 can also receive data directly from other sensors 143.

Figure 4:
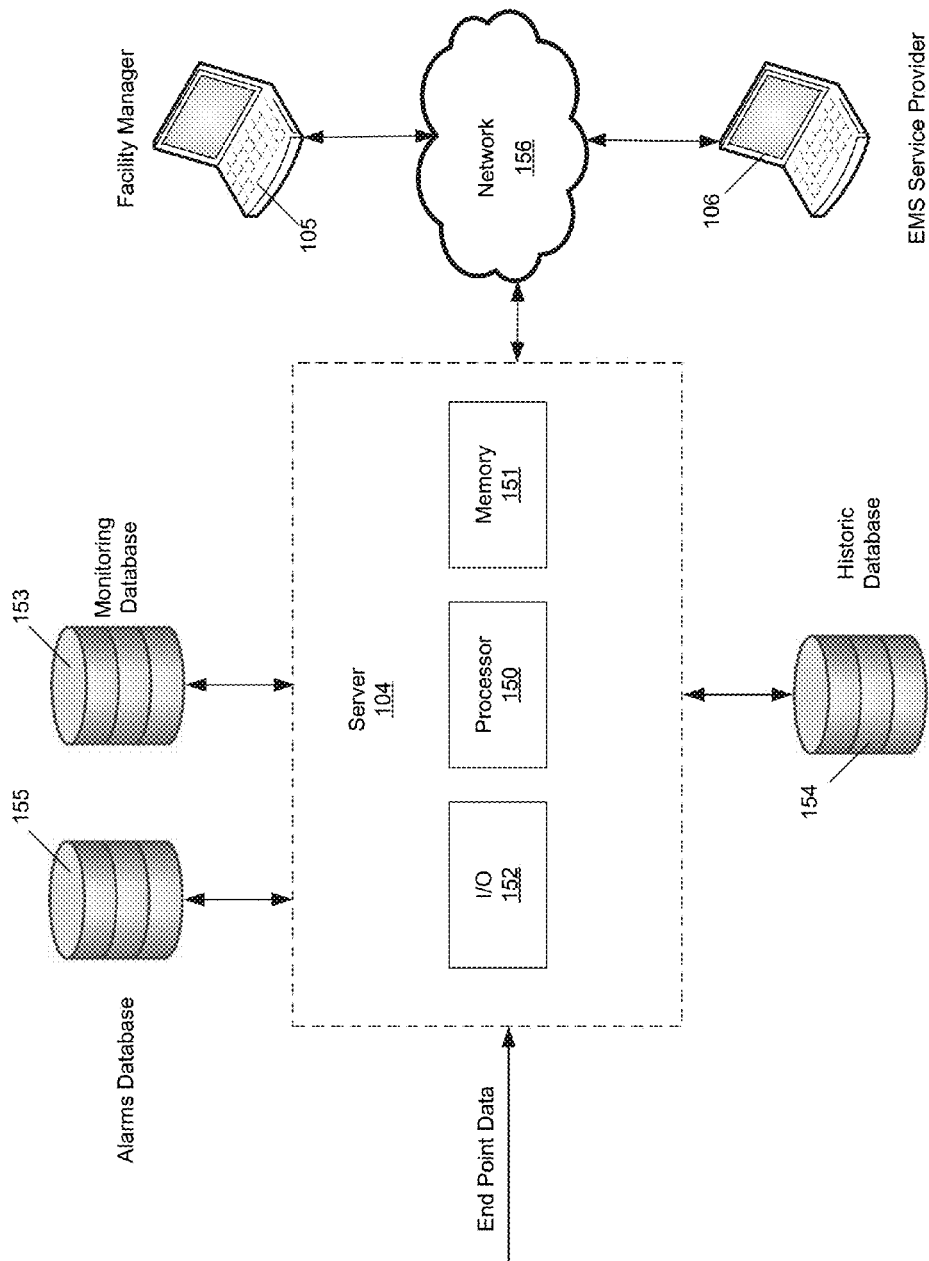
FIG. 4 is a block diagram illustrating a server system providing remote information access and control to a facility manager and EMS provider.

FIG. 4 is an illustration of server system 104 providing remote information access and control to a facility manager and EMS provider. The server 104 includes a processor 150, memory 151, and one or more I/O interfaces 152 for receiving end point data and communicating with the facility manager and/or EMS service provider terminals 105 and 106 via network 156. The server includes one or more databases, including a monitoring database 153 that stores recent endpoint data, a historic database 154 that stores historic data from one or more facilities, and an alarms database 155 that stores alarm definitions to which incoming endpoint data and historic data can be applied. The memory 151 consists of tangible data and program storage for storing and retrieving instructions for creating, editing, and executing alarms. The memory 151 can also include working memory from which to execute the instructions and other software necessary to operate the EMS.

Figure 5:
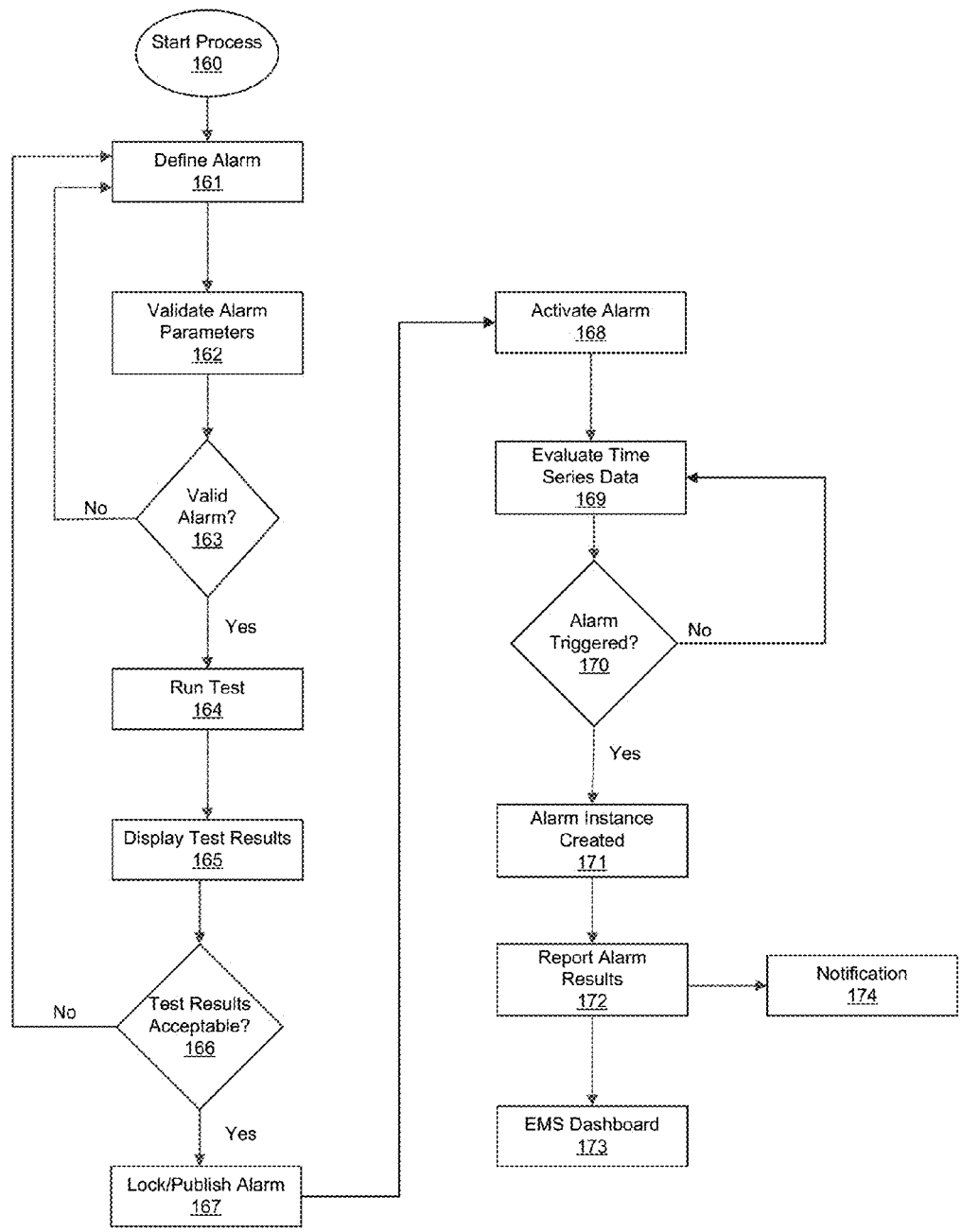
FIG. 5 is a flow diagram illustrating a process of creating alarms, activating alarms, and sending notifications

FIG. 5 is an illustration showing the process diagram for creating an alarm definition, activating the alarm definition and sending notifications for triggered alarms. Before any alarms can be received by the operator, the alarm must be created through a definitional process. The alarm design process is initiated in step 160 and alarm parameters are entered in step 161 using an alarm designer tool. The alarm designer tool is used as a frontend tool and is described in more detail in FIGS. 6, 7, and 8. In step 162, the alarm parameters are parsed and evaluated to determine whether the alarm definitions are valid, i.e., they follow proper alarm syntax and match existing alarm and channel attributes. As shown in step 163, if the alarm definition is invalid, then the user is returned back to the alarm definition entry screen to correct the alarm definitions. Invalid alarms can be saved in draft form but not locked or published. If the alarm definition is valid, the alarm definition is applied to time series channel data in step 164 and test results are displayed in step 165. In step 166, if the test results are unacceptable, then the user is permitted to return back to the alarm definition entry page to revise the alarm definition. If the test results are acceptable, the user is permitted to lock (or publish) the alarm in step 167. A locked alarm can be used by others as a blueprint for creating additional alarms. Locking the alarm also takes it out of the definitional stage and makes it available to be activated in step 168 in one or more systems.

Once an alarm is activated, the alarm definition is applied against live time series data as shown in step 169 and checked in step 170 to determine whether the alarm has been triggered. In an embodiment, the alarm definition is applied periodically based on the frequency of the alarm (e.g., every 15 minutes, every hour, or daily) contained in the alarm definition. All potential alarm instances are found based on the alarm definition and the premises selection, i.e., which data channels are to be evaluated against the alarm. The premises selection is often just "all premises associated with EMS operator's company" which means the potential instances evaluated for an alarm can grow over time as new sites are added to the EMS (alarm definition is inherited by newly added sites). However, more limited groupings of premises may be selected. A potential alarm instance means a set of applicable data at a site that may trigger an alarm instance if the alarm trigger conditions are met. As shown in step 171, once an instance triggers or closes, the details of the triggered alarm instance are reported as shown in step 172, and can be viewable in the EMS (step 173), and if notifications are enabled for the alarm, notifications such as emails, text messages, or the like may be sent directly to the operator as shown in step 174. The notifications contain information about the alarm and a hyperlink to the correct EMS dashboard for obtaining further details.

Figure 6:
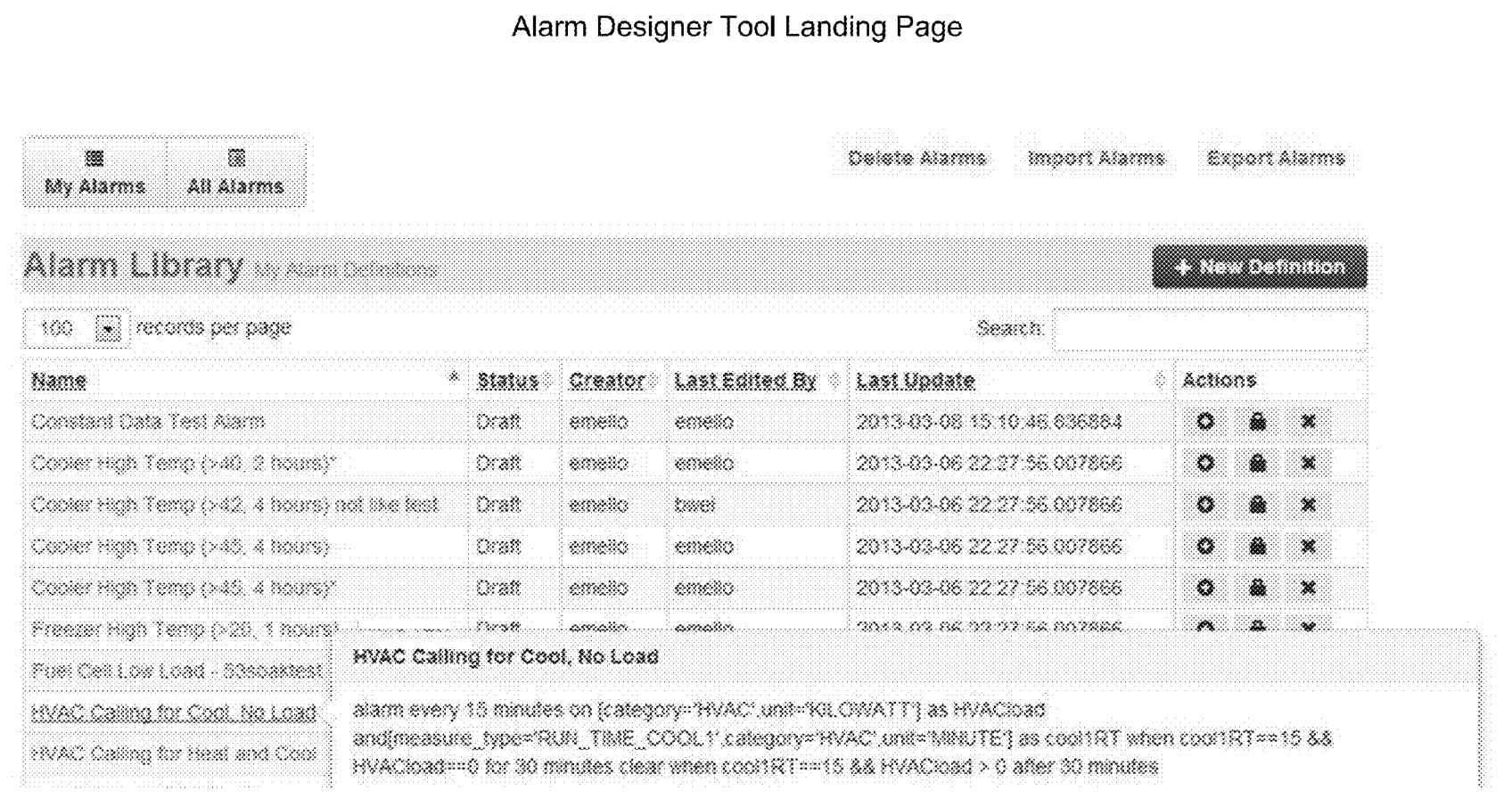

FIG. 6 is an illustration of the main landing page for the alarm designer tool, which shows a menu of alarm definitions that may be selected for editing. Shown is a list of alarm names, including a status, creator, and last edit date. Clicking on the alarm name brings up the alarm definition shown in FIG. 7. Hovering over any alarm name brings up a tooltip showing the alarm definition (without the need to go to page shown in FIG. 7). Also included are action buttons, shown on the right hand side of FIG. 6. These actions include the following functions: Clone (+) Icon; the ability to create a copy of an alarm definition and therefore a variation of the same alarm construct, Lock Icon; prevents further editing of an alarm definition and makes it a candidate for activation, and Delete (X) Icon; removes a draft alarm definition from the alarm library. From the library, a user can also create a new alarm definition from scratch (+ New Definition Icon), filter the view to see only the alarms they created (My Alarms Icon) or all alarms (All Alarms Icon). In addition, options to bulk delete, import or export alarms are provided.

FIG. 7 is an illustration of an alarm configuration entry screen for the creation or editing of alarms. Entry fields for alarm attributes include Name, Frequency, Applicable Data, Trigger conditions. Pending Open Duration, Close Condition, and Pending Close Duration.

In an embodiment, the Alarm Name must be unique, and if a user attempts to name an alarm with a name that already exists they will receive an error message.

The Alarm Frequency determines how often the system will evaluate the time series data and look for alarm trigger/close conditions. Select options include: Every 15 minutes, Hourly, or Daily, with the default value being every 15 minutes. However, other alarm frequencies can be chosen as long as the sub-metering hardware is capable of producing data at that frequency. This field is related to the pending periods described below, in that the pending periods must be multiples of the frequency. For example, if an alarm will be evaluated hourly, it cannot have a pending period of 15 min. It must be 1 hour, 2 hours, etc.

The Applicable Data field is used to find the channel or channels on which the alarm will trigger. There is a basic syntax a user must use to define a valid applicable data definition. Not all components of the syntax expression are required in order to define a channel. Rather, the invention can operate using a single component—such as a descriptor of Channel Name, a channel's Measurement Type, a channel's Data Category, or a channel's Unit of Measure.

For example, the single channel applicable data definition for a static Refrigeration temp alarm on cooler/refrigeration channels may might be as follows:

avg
[channel_name='*Cooler*or*Clr*or*Refrig*not*Freezer*, category='Refrigeration',unit='Degrees F']over 1
hour as Cooler In the above example, wildcard characters (*) can be used to find channel names, "like" or "not like" specified strings, and "Cooler" is the alias given to the channel.

The Applicable Data portion of an alarm definition relies on one or more of the following important attributes existing for all channels in the database that will be evaluated for alarming conditions: the channel name (e.g. Cooler 1), channel category (e.g. Refrigeration), channel measure type (e.g. Asset Temperature) and channel unit (e.g. Degrees F). This channel metadata is used as a very effective qualifier to identify only the desired channel/channels that form the applicable data for the evaluation of the alarm. As mentioned above, only one of the attributes associated with a channel is required in order to define applicable data, which serves as the foundation of alarm definitions that can be enabled at scale across all current and future sites that may have matching channel attributes.

Channels in the database may also form logical "systems" when they all describe data for a particular asset (and such systems are also attributes of channels in the database). For example, a single HVAC unit may have dozens of related data channels such as the unit's heat and cool runtimes, the power demand (or load), the zone temperature for the zone it's heating/cooling, the duct temperature that describes the temperature of the unit's supply air, etc. When an applicable data definition includes more than one channel, and these channels can be grouped by systems, potential alarm instances are created and evaluated for trigger conditions not just by site, but also by system. For example, it is possible to create a simple two channel alarm with applicable data as follows that looks for both the cool runtime and load on an HVAC unit:

[category='HVAC',unit='kilowatt']as HVACload and
[measure_type='runtime cool1', category='HVAC',unit='minute']as cool1RT When potential alarm instances are created for an alarm definition with the above mentioned applicable data, a site that has three HVAC systems will have three potential alarm instances created, grouped by HVAC unit.

The Trigger Conditions are the conditions the applicable data must meet to trigger an alarm instance. This field uses numeric values, the alias (or aliases) given to the channels in the Applicable Data definition, and basic operators including (but not limited to): + (plus), / (divided by), − (minus), * (multiplied by), % (percentage), "==" (equals), ">=" (greater than or equal to), "!=" (does not equal to), "&&" (and), "||" (or) to clearly state what the channel or channels must do in order to trigger an alarm. For example, the Trigger Condition Cooler<32||Cooler>45 could be used to find coolers with abnormally high or low temperatures in a single alarm. Or for a multi-channel alarm like the HVAC example above, the Trigger Condition might be something like Cool1RT==15 && HVACload==0 to find HVAC units that have been calling for cooling for 15 minutes but are drawing no load. Additionally, trigger conditions can consider a channel or channels' behavior over periods of time as well as conditional relationships between multiple channels. For example, an alarm can be defined to find channels that exceed the average daily usage for that channel, or another channel by a specified percentage. Likewise, an alarm can be defined to trigger if Channel A minus Channel B is greater than X times Channel C.

The Pending Open Duration parameter is where the alarm creator specifies the time the trigger conditions must continue before an alarm officially opens and becomes an alarm instance. Valid Pending Open Durations must be equal to or greater than the alarm frequency. In addition, the Pending Open Duration must be a multiple of the frequency of the alarm. For example, you cannot have a pending period of 45 minutes for an alarm with 1 hour frequency, only for one with a 15 min frequency. For a daily alarm, the pending open duration must be 24 hours or 48 hours, etc.

The Close Condition parameter specifies the conditions the applicable data must meet to close a triggered alarm instance. In most cases, this is the resolution of the Trigger Condition, but it may be defined differently. For example, a CO2 concentration alarm may have a Trigger Condition of CO2>1000 (parts per million), but a Close Condition of CO2<800. The ability to define separate open and close conditions results in better quality alarms.

The Pending Close Duration parameter specifies the time the close conditions must continue before an alarm officially closes. The same rules that apply to Pending Open apply to Pending Close.

Figure 8:
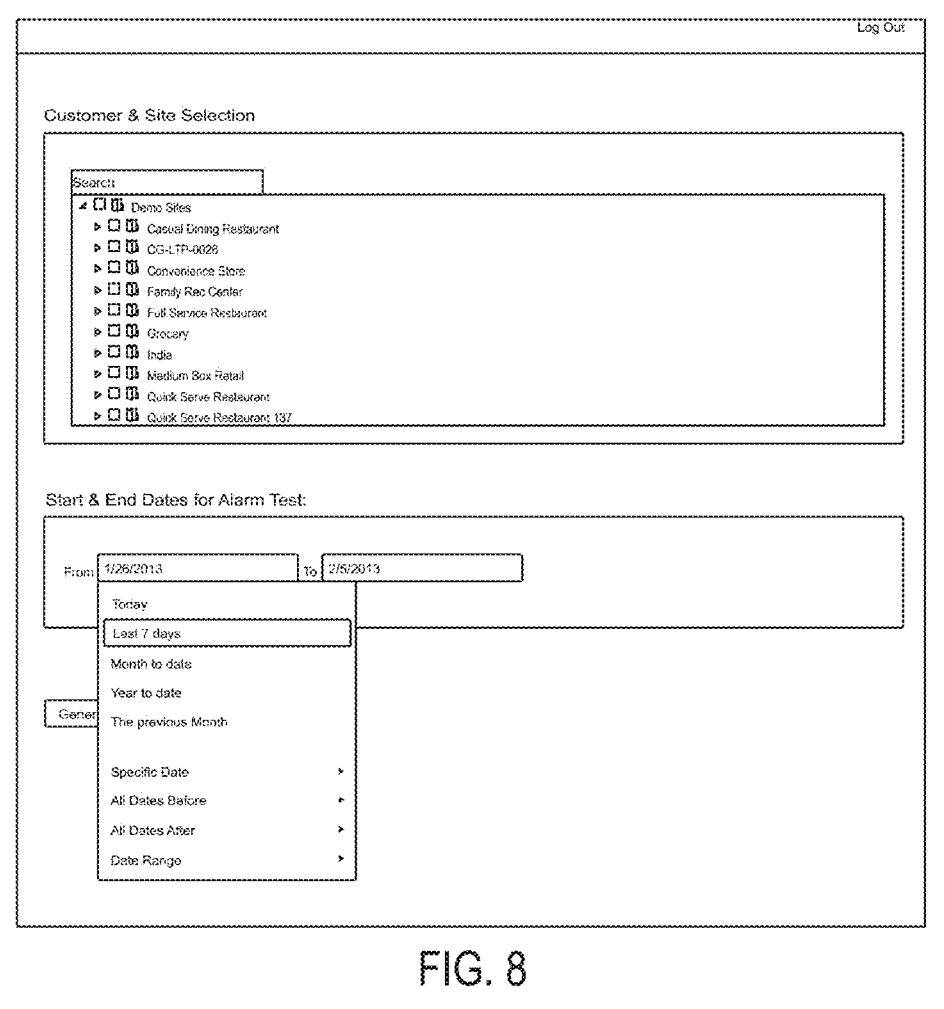

The bottom of FIG. 7 shows the Save and Validate button. This button triggers validation to ensure the alarm parameters entered do not have any errors (that proper syntax is used and that the above mentioned rules for each parameter are adhered to). Only validated alarms can be tested, locked or activated in the EMS. FIG. 8 is an illustration of the alarm site tree and test date selection for the creation of an alarm test results file. Once a valid definition has been saved, this area of the alarm designer tool is used to create test files against actual historical data for sites. Upon selecting sites and a date range for the test, the user clicks a "Generate Test Result" button to trigger the creation of a report for analysis of what would have happened had this alarm been in place at the selected sites for the selected historical date range. The report can be displayed in a user interface or saved as a data file and later displayed using spreadsheet software.

FIG. 9 is an illustration of an alarm test results Parameters Report. This report contains the alarm definition and test information, such as alarm name, number of selected sites, number of potential instances created, and all the alarm parameters (frequency, trigger condition, close condition, pending durations).

Figure 10:
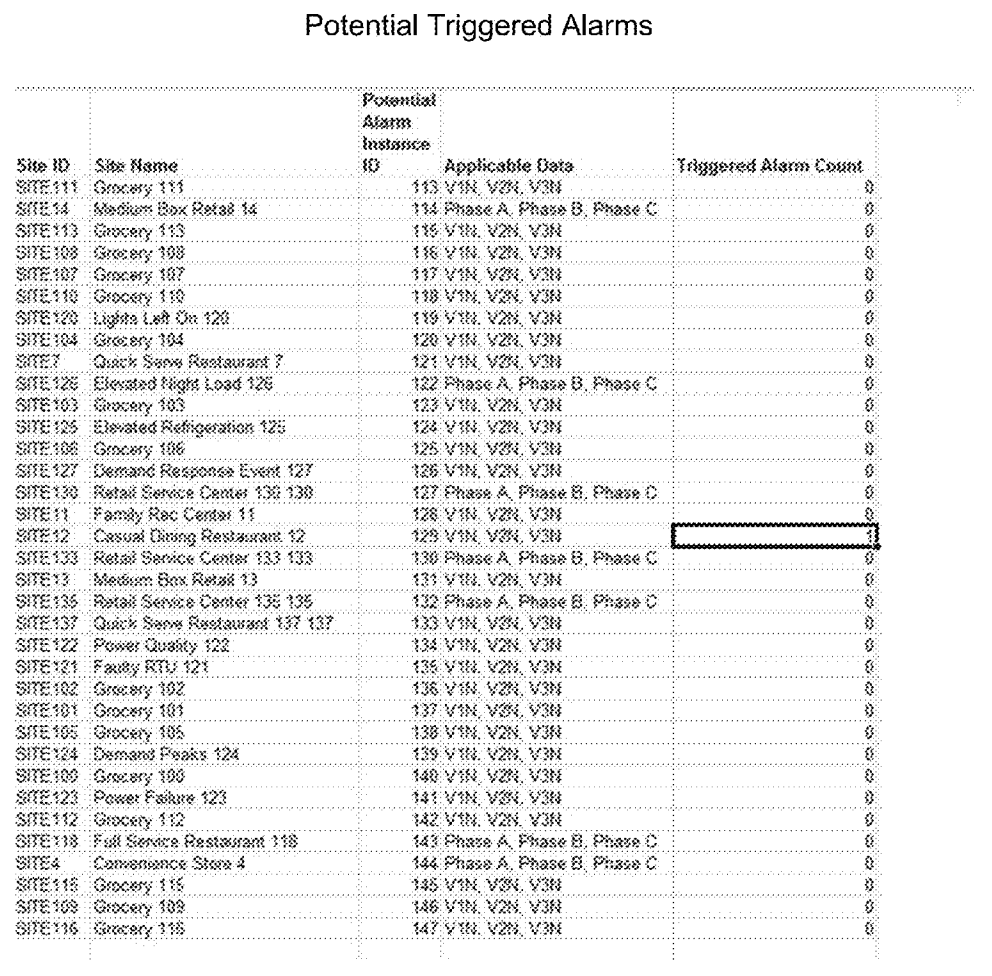

FIG. 10 is an illustration of an alarm test results Potential Alarm Instances Report. This report contains a list of all potential alarm instances created for the selected sites. A potential alarm instance is a channel (for single-channel alarms) or a group of channels (for multi-channel alarms) that meets the applicable data criteria of the alarm definition. It contains the basic information about which channel/channels were evaluated for trigger conditions. It also includes a count of what alarms actually did trigger for each instance over the time range selected for the test.

FIG. 11 is an illustration of an alarm test results Triggered Alarms Report. This report shows a table similar to the table a user would see and could export from the EMS software portal. The table includes site descriptors (Site ID, Site Name, Site Address, etc.), Applicable Data (specific to instance—so it will show the exact channel name(s) for the site), Alarm Start Time, Alarm End Time, Alarm Duration and Alarm State (whether alarm is still open or closed as of the end of the test period).

FIG. 12 is an illustration of an alarm test results Pending Open Alarms Report. This report shows avoided alarm instances where trigger conditions did not last the full pending open duration. These rows would NOT result in an Open Alarm if the alarm were enabled in the EMS. Reviewing this tab helps the user determine if they have set the right Pending Open Duration for the alarm.

FIG. 13 is an illustration of an alarm test results Pending Close Alarms Report. This report shows avoided REPEAT alarm instances where close conditions did not last the full pending close duration. These rows give the user a sense of what repeated alarm instances were avoided due to the specified pending close duration (and may cause them to adjust that parameter).

Displaying the various outputs of an alarm provides a quantitative view of the efficacy of the alarm and allows a user to adjust certain parameters to adjust alarm open and close sensitivity, as well as the aggregate amount of data generated by the alarm. The alarm can be edited and reevaluated until the alarm is optimized to meet the needs of the energy consumer. After the alarm can be published for use by applying it against one or more direct or virtual data channels.

Figure 14:
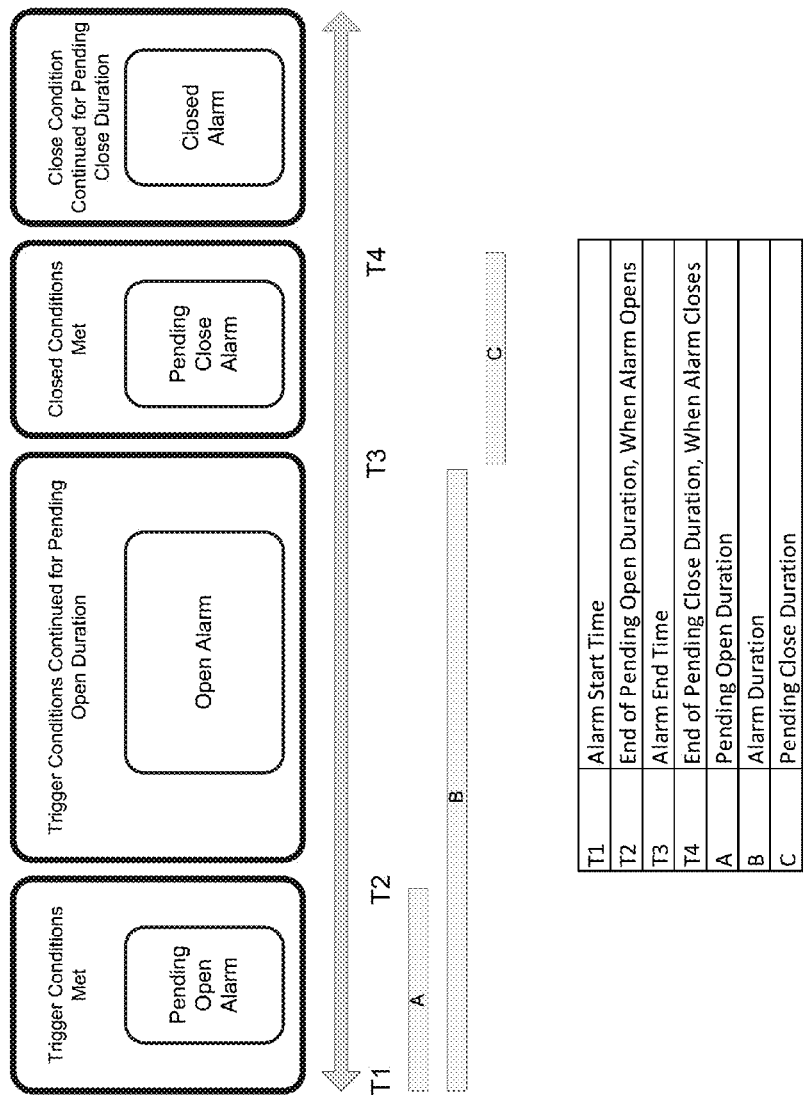
FIG. 14 is a timeline diagram showing an example of an alarm lifecycle.

FIG. 14 is first illustrative example of an alarm lifecycle. In this example, at time 1, a pending open status is the result of the trigger conditions being met, but the pending open duration has not yet been satisfied. At time 2, the pending open duration has been met and an open alarm is created and sent to the operator. At time 3, the close conditions have been met, but the pending close duration has not been met. At this time, the alarm moves to a pending close status, but the alarm stays open. At time 4, the close duration has been met and the alarm closes. T1 and T3 represent, respectively, when the start and end times would appear in the EMS (or when notifications would be sent to the operator).

Figure 15:
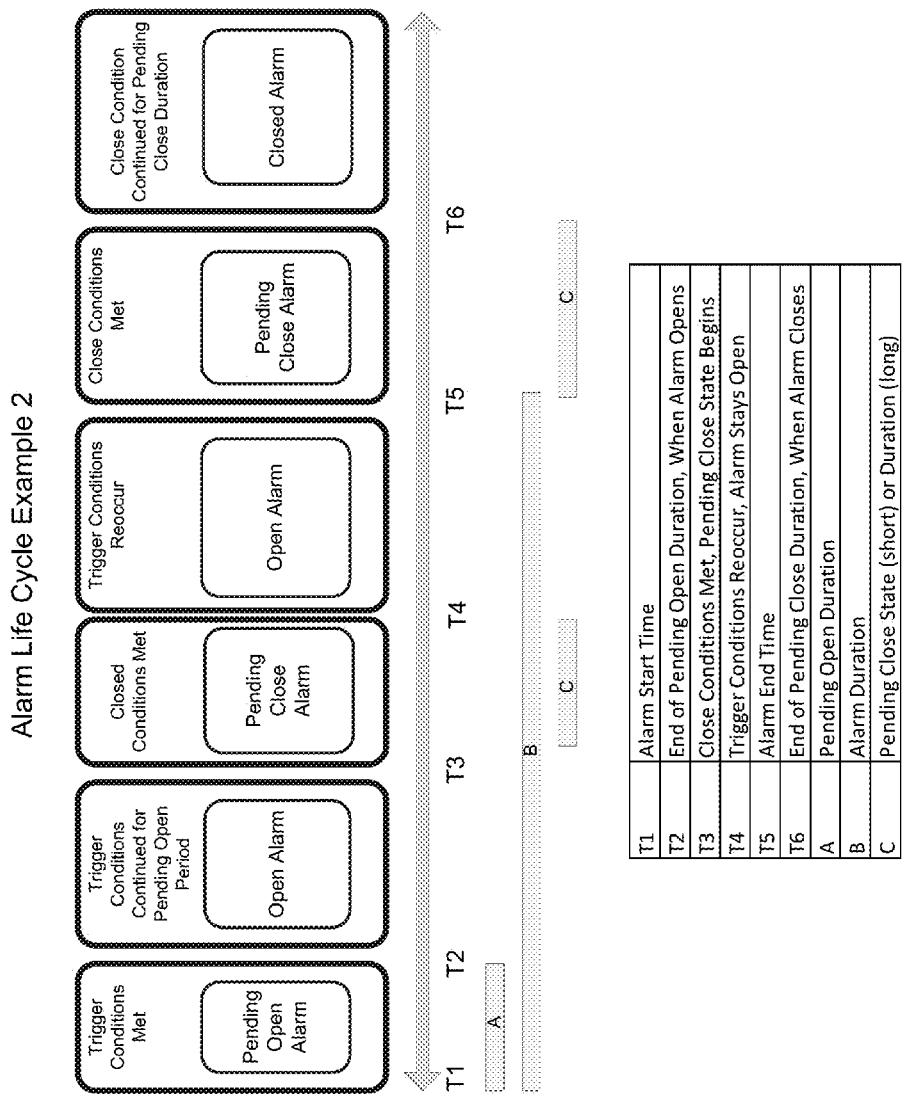
FIG. 15 is a timeline diagram showing an example of an alarm lifecycle for an alarm with a pending close state that did not result in a closed alarm.

FIG. 15 is a second illustrative example of an alarm lifecycle for an alarm with a pending close state that did not result in a closed alarm. This diagram shows that a single alarm is opened and closed and a repeat alarm instance is avoided due to the existence of a pending close duration.

In this example, at time 1, the trigger conditions are met, resulting in a pending open alarm. At time 2, the trigger conditions continued for the pending open duration, resulting in an open alarm, which is sent to the operator. At time 3, the close conditions are met, resulting in a pending close alarm. At time 4, the trigger conditions are met again, preventing the alarm from closing. At time 5, the close conditions are met, resulting in a pending close alarm. At time 6, the pending close duration is met and the alarm closes. As can be appreciated, had the open and close period been absent, the alarm would have triggered and closed twice, resulting in a noisy or repeat alarm.

Figure 16:
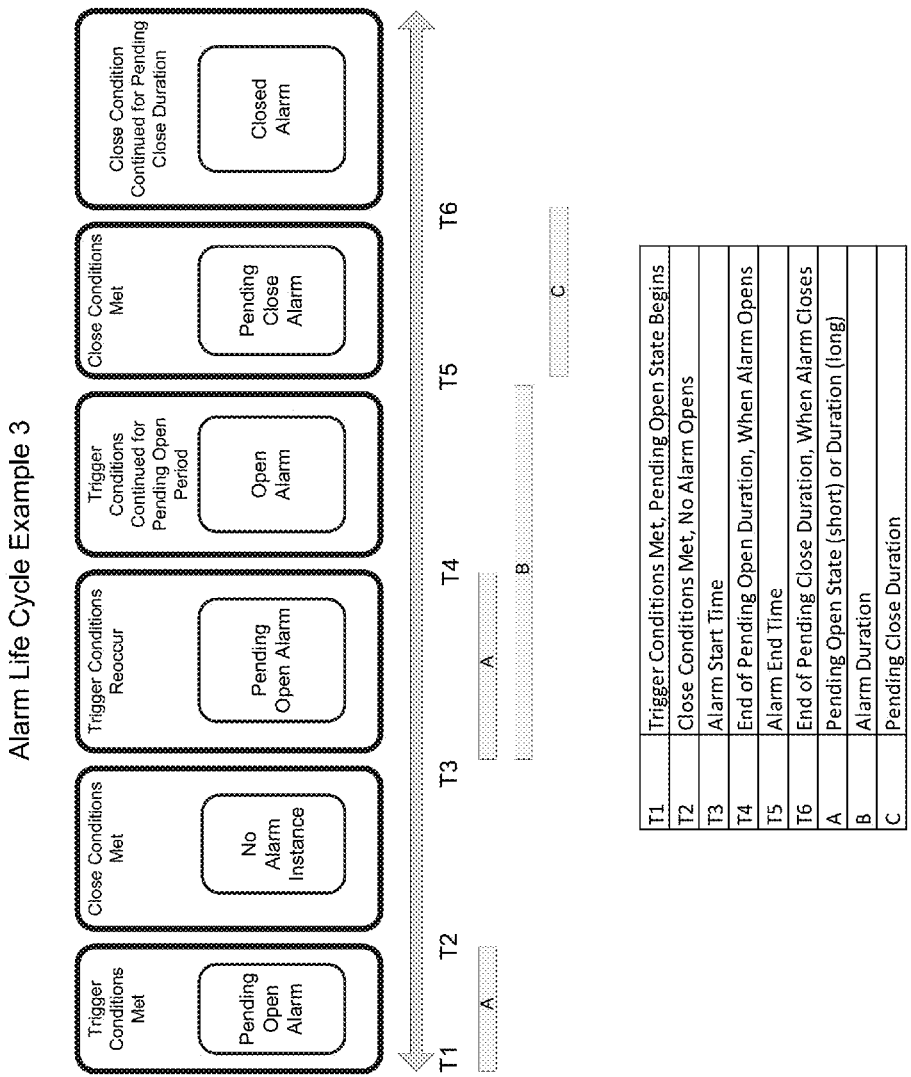
FIG. 16 is a timeline diagram showing an example of an alarm lifecycle for an alarm with a pending open state that did not result in an open alarm.

FIG. 16 is a third illustrative example of an alarm lifecycle for an alarm with a pending open state that did not result in an open alarm. In this scenario, a single alarm is opened and closed and a repeat alarm instance is avoided due to the existence of a pending open duration. Bar A represents a period of time where the trigger conditions were met for the alarm, but this did not result in an open alarm because the conditions were not met for the full pending open period.

At time 1, the trigger conditions are met, resulting in a pending open alarm. At time 2, the close conditions are met, which results in no alarm instance (and avoided noisy alarm). At time 3, the trigger conditions reoccur, resulting in a pending open alarm. At time 4, the pending open duration is met, resulting in an open alarm. At time 5, the close conditions are met, resulting in a pending close alarm. At time 6, the pending close duration is met, resulting in a closed alarm. As can be appreciated, had the open and close durations been absent, the alarm would have triggered and closed twice, resulting in a noisy alarm.

As a result, the pending open duration prevents the alarm from being opened until there is sufficient history of the trigger condition to warrant an alarm, and non-persistent anomalies will not cause overly frequent alarms. Conversely, the pending close duration prevents the alarm from closing prematurely due to a momentary close condition. The open period and close period can reduce alarms, whether operating alone or in conjunction.

Figure 17:
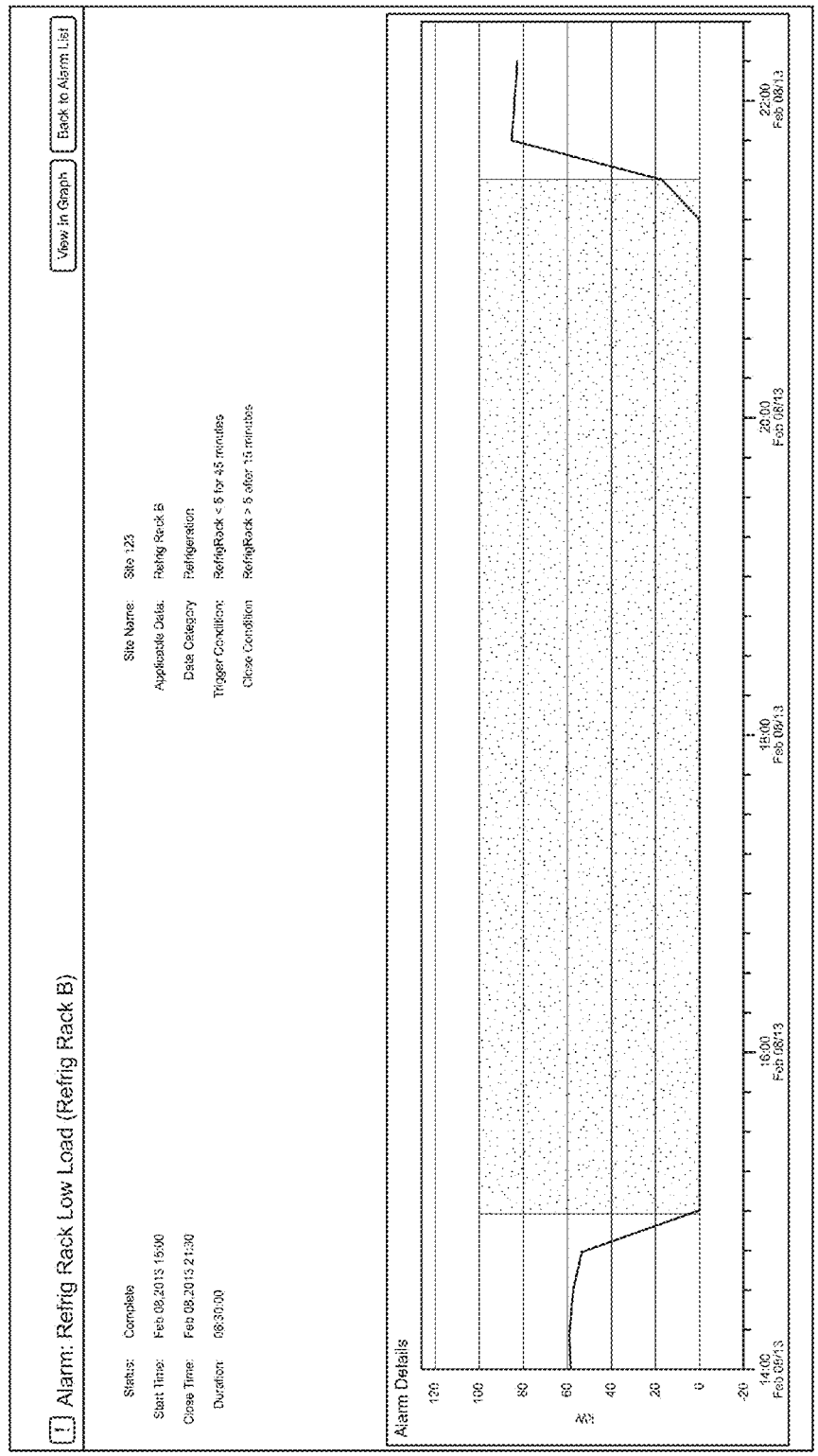
FIG. 17 is a graph illustrating a single-channel alarm displayed to an operator.

FIG. 17 is an illustration showing a single-channel alarm displayed to an operator. The EMS would have several links or paths for the operator to navigate to this view. For example, she may have used tooltips on site pins on a map that indicate an alarm is occurring at a site, or have gone into the "Alarms" module in the EMS system and reviewed the alarm counts by alarm type for many sites, then drilled into this particular alarm instance. The illustration shown is the "Alarm Detail" view (where the operator can review all the important details related to the alarm). The graph shown in this view also includes "context intervals" before and after the actual alarm duration and shades the alarm duration in order to show that the channel is deviating from its normal behavior. For example, the graph shows the alarm duration as a shaded portion of the graph between time 15:00 and 21:30 and the pre-alarm and post-alarm context intervals between 14:00-15:00 and 21:30 and 22:30, respectively. From this view, the operator can chose to "View in Graph" which would give them the opportunity to visualize other site channels that may not be directly tied to the alarm, but may have had an effect on or had been affected by the alarm. For example, when drilling into Graphs, the operator could chose to graph the Local Temperature (weather) channel along with the alarming channels to review how weather may have impacted the alarming channels.

Figure 18:
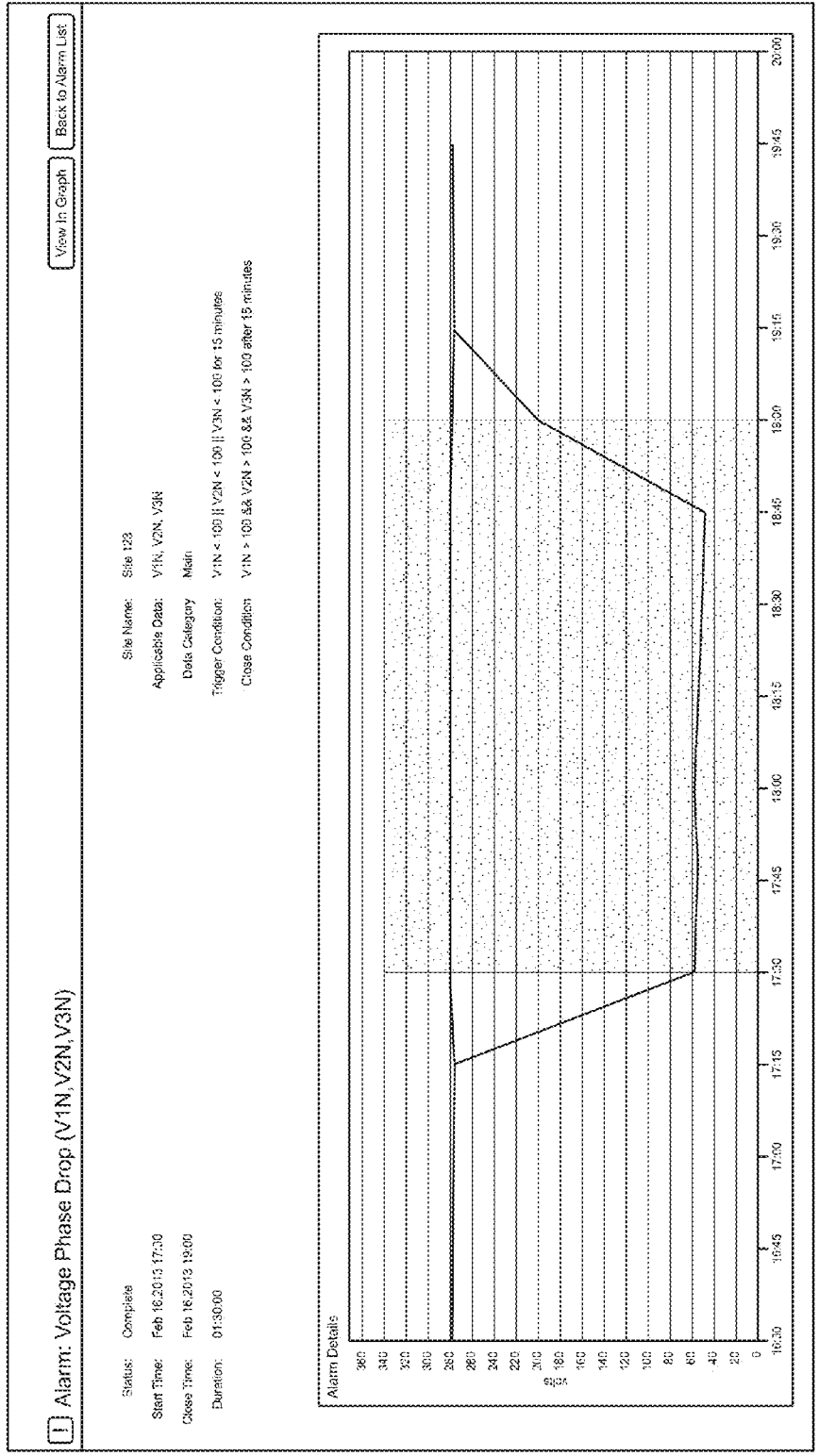
FIG. 18 is a graph illustrating a multi-channel alarm displayed to an operator.

FIG. 18 is an illustration showing a multi-channel alarm displayed to an operator. Similar to the single-channel alarm, this view shows all applicable data channels and the "context" before and after intervals showing how the channels are deviating from their expected behavior. Any number of channels can be displayed in this view using colored or textured lines to differentiate channels.

Email notifications or other types of notifications can be configured to be sent upon open and/or close of an alarm, so that operators can be notified without the need to be logged into the EMS software portal. Depending on the notification settings, the message may be different for different alarm types, and may include a graphical image (not shown). Also included in the email notification is a link directly to the EMS where the operator can drill into the detail described in FIGS. 17 and 18.

The present invention is described above with reference to block diagrams and operational illustrations of methods and devices for creating alarms in an energy management system. It is understood that each block of the block diagrams or operational illustrations, and combinations of blocks in the block diagrams or operational illustrations, may be implemented by means of analog or digital hardware and computer program instructions. These computer program instructions may be stored on computer-readable media and provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

At least some aspects disclosed can be embodied, at least in part, in software. That is, the techniques may be carried out in a special purpose or general purpose computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, firmware, ROM, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a data processing system causes the system to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although the present invention has been described in considerable detail with reference to certain preferred versions thereof, other versions are possible. Therefore, the spirit and scope of the appended claims should not be limited to the description of the preferred versions contained herein. The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. A method of creating alarms triggered based on conditions of assets at one or more sites, the assets being monitored by an EMS software platform, the EMS software platform including an alarm designer software tool that can create new alarm definitions, the method comprising:
defining applicable channel data using one or more channel attributes, wherein the applicable channel data identifies which channels associated with the one or more sites are to be evaluated for alarming conditions;
defining alarm definition parameters, including (1) a frequency, (2) a trigger condition, (3) a pending open duration, (4) a close condition, and (5) a pending close duration;
applying the alarm definition parameters against test channel data having the same one or more channel attributes as the defined applicable channel data;
generating test results, including potential alarm instances created based on the trigger condition and avoided alarms based on the pending open duration; and
saving the alarm definition parameters.

2. A non-transitory computer program product for creating alarms triggered based on conditions of assets at one or more sites, comprising:
a computer usable medium having computer readable program code embodied in the computer usable medium for causing an application program to execute on a computer system, the computer readable program code comprising:
computer readable program code for defining applicable channel data using one or more channel attributes, wherein the applicable channel data identifies which channels associated with the one or more sites are to be evaluated for alarming conditions;
computer readable program code for defining alarm definition parameters, including (1) a frequency, (2) a trigger condition, (3) a pending open duration, (4) a close condition, and (5) a pending close duration;
computer readable program code for applying the alarm definition parameters against test channel data having the same one or more channel attributes as the defined applicable channel data;
computer readable program code for generating test results, including potential alarm instances created based on the trigger condition and avoided alarms based on the pending open duration; and
computer readable program code for saving the alarm definition parameters.

3. The method of claim 1, wherein the test results include avoided repeat alarms in which the close condition did not last the pending close duration.

4. The method of claim 1, wherein the one or more channel attributes includes one or more of the following: a channel name, a unit of measure, a measurement type, and a channel category.

5. The method of claim 1, wherein the applicable channel data are grouped by site or system, and the potential alarm instances include a potential trigger of a group of channels.

6. The method of claim 1, wherein the close condition for an alarm is defined independently from the trigger condition, and wherein the pending open duration is defined independently from the pending close duration.

7. The method of claim 1, wherein the trigger condition includes a conditional relationship between two or more of the applicable channel data.

8. The method of claim 1, further comprising copying alarm definition parameters to create a new alarm, and editing the copied alarm definition parameters to create the new alarm.

9. The method of claim 1, further comprising validating the alarm definition parameters, wherein validation includes ensuring the alarm definition parameters do not have errors.

10. The method of claim 1, wherein the test channel data includes historical data from a site, and the method further includes selecting a date range of the historical data and generating test results for the alarm definition parameters using the selected date range of the historical data.

11. The method of claim 1, wherein the test results include which potential alarm instances developed into triggered alarms, which potential alarm instances did not develop into triggered alarms but met trigger conditions for a duration less than the pending open duration, which triggered alarms closed, and which triggered alarms met close conditions for a duration less than the pending close duration.

12. The product of claim 2, wherein the test results include avoided repeat alarms in which the close condition did not last the pending close duration.

13. The product of claim 2, further comprising energy management system software, wherein the assets are monitored by the energy management system software.

14. The product of claim 2, wherein the one or more channel attributes includes one or more of the following: a channel name, a unit of measure, a measurement type, and a channel category.

15. The product of claim 2, wherein the applicable channel data are grouped by site or system, and the potential alarm instances include a potential trigger of a group of channels.

16. The product of claim 2, wherein the close condition for an alarm is defined independently from the trigger condition, and wherein the pending open duration is defined independently from the pending close duration.

17. The product of claim 2, wherein the trigger condition includes a conditional relationship between two or more of the applicable channel data.

18. The product of claim 2, further comprising computer readable program code for copying alarm definition parameters to create a new alarm, for editing the copied alarm definition parameters to create the new alarm, and for validating the alarm definition parameters, wherein validation includes ensuring the alarm definition parameters do not have errors.

19. The product of claim 2, wherein the test channel data includes historical data from a site, and the product further includes computer readable program code for selecting a date range of the historical data and for generating test results for the alarm definition parameters using the selected date range of the historical data.

20. The product of claim 2, wherein the test results include which potential alarm instances developed into triggered alarms, which potential alarm instances did not develop into triggered alarms but met trigger conditions for a duration less than the pending open duration, which triggered alarms closed, and which triggered alarms met close conditions for a duration less than the pending close duration.

* * * * *